United States Patent [19]
Howell

[11] Patent Number: 5,920,611
[45] Date of Patent: *Jul. 6, 1999

[54] METHOD OF INTERCEPTING TELECOMMUNICATIONS

[75] Inventor: Robert Mark Howell, Boca Raton, Fla.

[73] Assignee: Siemens Information and Communication Networks, Inc.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/724,111

[22] Filed: Sep. 30, 1996

[51] Int. Cl.$^6$ .............................. H04M 1/24; H04M 3/42
[52] U.S. Cl. .............................. 379/35; 379/211; 379/213
[58] Field of Search .................................. 379/1, 7, 8, 34, 379/35, 201, 210, 211, 213, 214

[56] References Cited

U.S. PATENT DOCUMENTS

| | | | |
|---|---|---|---|
| 4,527,015 | 7/1985 | Chambers et al. | 379/35 |
| 5,351,287 | 9/1994 | Bhattacharyya et al. | 379/35 |
| 5,590,171 | 12/1996 | Howe et al. | 379/35 |

*Primary Examiner*—Paul Loomis
*Attorney, Agent, or Firm*—Joseph S. Codispoti

[57] ABSTRACT

A method of intercepting the incoming and outgoing calls of a telecommunications subscriber. The call activity of the telecommunications line of the subscriber is monitored by a call processor of a telecommunications switch and predetermined types of call activity are recorded by a recording device. The switch monitors the call activity of a second telecommunications line upon the detection of a predetermined call feature occurring for the subscriber and the recording device records predetermined types of call activity on the second line upon the monitoring of the second line. The switch may also switch, upon the detection of the predetermined call feature, from monitoring the call activity of the subscriber line to monitoring the call activity of the second line. The switch may also switch the recording device from recording the call activity of the subscriber line to recording the call activity of the second line. This may be done by switching the connection of the recording device from the subscriber line to the second line.

24 Claims, 3 Drawing Sheets

METHOD OF INTERCEPTING TELECOMMUNICATIONS

FIELD OF THE INVENTION

A related application entitled "TELECOMMUNICATIONS INTERCEPT SYSTEM" by the same inventor, is being filed on the same day herewith and is incorporated by reference herein.

This invention relates generally to wiretapping systems and more particularly to wiretapping systems used by authorized law enforcement agencies to protect the public.

BACKGROUND OF THE INVENTION

As is known in the art, law enforcement agencies, when authorized by a court, may use wiretapping on the telephone line to provide monitoring of incoming and/or outgoing calls to, or from, a telephone subscriber under surveillance (i.e., sometimes referred to as a "target"). One technique used to provide such wiretap is to connect a so-called pen register (or dialed number recorder (DNR)) on the target telephone line. The pen register is adapted to monitor, i.e., record, transmissions on the target telephone line. The transmissions to be monitored are usually only signalling information, such as the on-hook/off-hook condition of the target telephone line as well as dialing signals, i.e., tone or pulse, as well as the telephone number of the calling party (i.e., calling number delivery (CND) information). The transmissions to be monitored may, when authorized by a court, include the voice conversation taking place on the target telephone line. Activities of interest that occur during these monitored transmissions, i.e., so-called target events, are then typically recorded in a memory, storage medium, and/or on paper for later interpretation and analysis by the law enforcement agency.

The pen register represents loop-based intercept equipment, i.e., external plant equipment that is installed in the subscriber loop. Specifically, the pen register is coupled to the target line through an interface unit. This is usually done by placing the interface unit in the crossbox, central office, listening post (i.e., the location of the pen register itself), or other point in the loop of the target telephone line and extending the subscriber loop from the interface unit to a remotely located pen register. The interface unit typically includes a decoder and amplifier. The decoder, when included, converts on-hook/off hook and rotary dc voltage change signalling pulses into DTMF tones. More particularly, when the target telephone line is on-hook, the decoder produces a constant "fourth column" DTMF "C" or "A" tone. When, from a rotary phone, the digit "3" is dialled, the decoder converts the three dc pulses produced by the rotary telephone into a series of three, "fourth column" DTMF "A" or "C" tones. These decoder-produced tones are amplified in the amplifier of the interface unit prior to transmission to the remotely located pen register. When the pen register is located at or near the coupling point to the target line, the interface may not be required to provide decoding and amplification and, in such case, the pen register records the dc signaling changes directly.

As is also known in the art, call-forward is a feature offered by many telephone companies which enables a subscriber to have calls to be received forwarded to another telephone number (i.e., to the call-forwarded telephone number) under one of a number of different conditions, such as: the called party's telephone is off-hook or busy; the called party's telephone remained unanswered after a predetermined number of rings; or, unconditionally, i.e., the subscriber has requested that all incoming calls be forwarded to the call-forwarded telephone number. Thus, with the wiretapping arrangement described above, the pen register, being located on the target telephone line of the called telephone number, and not on the telephone line of the call-forwarded telephone number, will not record the calling event to, or from, the target telephone line.

SUMMARY OF THE INVENTION

In accordance with the present invention, a method of intercepting a call on a telecommunications line is provided. The method includes a) monitoring the call activity on a telecommunications line; b) determining whether or not call-forwarding is occurring on the telecommunications line; and c) recording the call activity of the call-forwarded telecommunications line. The call activity on the telecommunications line may be continued to be monitored if it is determined that call-forwarding is not occurring on the telecommunications line.

The method may also determine whether or not the call activity of the call-forwarded telecommunications line may be recorded. Alternatively, the call activity of the call-forwarded telecommunications line may be recorded upon the meeting of predetermined criteria.

The step of recording the call activity of the call-forwarded telecommunications line may include monitoring the call activity on the call-forwarded telecommunications line and recording predetermined types of call activity. Further, the call activity to be recorded may comprise at least one call activity selected from the group consisting of signalling information, voice, data, image, and multimedia information. Each telecommunications line may also comprise multiple transmission channels that are adapted to carry various types of call activity.

The present invention also provides a method of intercepting a telecommunications call, comprising a) monitoring the call activity on a first telecommunications subscriber loop; b) recording the call activity on the first telecommunications subscriber loop; c) recording the call activity of a second telecommunications subscriber loop upon the detection of a predetermined call feature occurring for the first loop.

The present invention also provides a method of intercepting the incoming and outgoing calls of a telecommunications subscriber, comprising a) monitoring by a telecommunications switch the call activity of the telecommunications line of the subscriber; b) recording by a recording device predetermined types of call activity on the subscriber telecommunications line; c) monitoring by the telecommunications switch the call activity of a second telecommunications line upon the detection of a predetermined call feature occurring for the subscriber; and d) recording by the recording device predetermined types of call activity on the second telecommunications line upon the monitoring of the second line.

BRIEF DESCRIPTION OF THE DRAWINGS

For a better understanding of the invention, reference is made to the following description of an exemplary embodiment thereof, and to the accompanying drawings, wherein.

DETAILED DESCRIPTION

Figure 1:
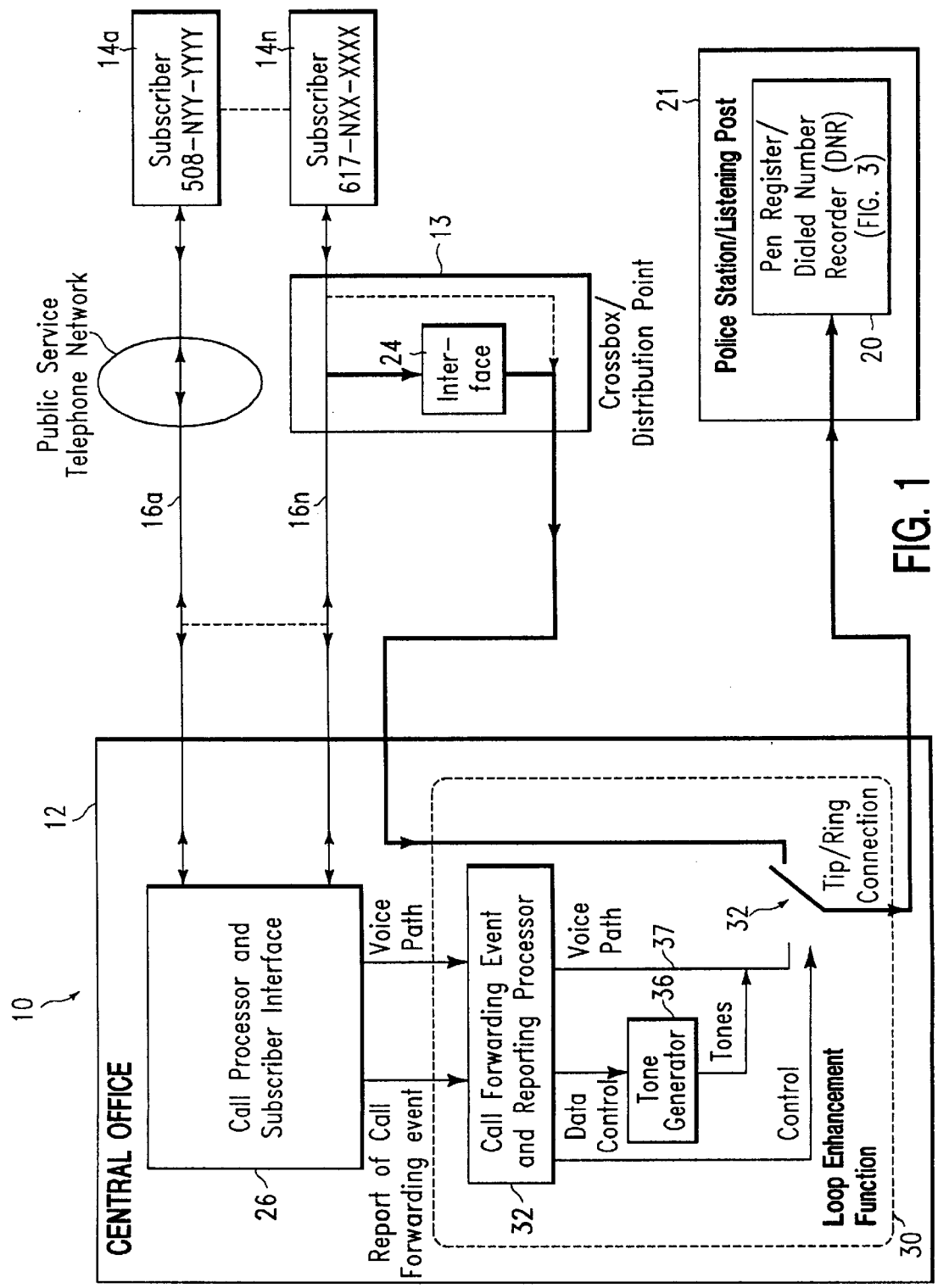
FIG. 1 is a block diagram of a telephone system using the wiretapping system according to the invention.

Referring now to FIG. 1, a telephone system 10 is shown having a central office 12 interconnected to a plurality of, here n, telephone subscribers 14a–14n, through telephone lines 16a–16n, respectively. Here, a crossbox 13 (i.e., a distribution point in the network which allows access to the target subscriber's loop) is coupled between subscriber 14n and the central office, as shown and line 16n is here coupled to the recording device through interface 24 and switch 22, as shown. It should be understood, however, that other subscribers such as, for example, subscriber 14a may also be coupled to the crossbox 13. One of the subscribers 14a–14n, here subscriber 14n has been authorized by a court for surveillance; i.e., the telephone line 16n is a "target". Thus, the telephone line 16n is connected to a recording device 20, here a pen register or dial number recorder (DNR), located at a police station 21 (i.e., listening post) through a switch 22. Here, a pen register interface 24 is located in the crossbox 13, as shown. It should be understood, however, that the interface 24 may not be needed, may be placed between the central office 12 and the target 14n, or may be placed between the listening post, here the police station 21, and the central office 12, or may be located within the central office 12. That is, the interface device, if needed may be placed at any point between the subscriber 14n and the pen recorded 20, as applicable.

The central office 12 includes a call processor 26 here adapted to forward calls to called-forwarded telephone numbers. Thus, any one of the plurality of subscribers 14a–14n may instruct the telephone company to forward calls to such subscriber to a designated call-forwarded telephone line. For example, the subscriber connected to the target telephone line 16n (i.e., subscriber 14n) may instruct the telephone company to call forward all calls to the target's telephone line (i.e., directory number 617-NXX-XXXX) to the telephone line 16a (i.e., directory number 508-NYY-YYYY) of subscriber 14a, for example. These call-forwarding instructions are presented to the call processor 26. Thus, when a call is placed to the target telephone line 16n (i.e., directory number 617-NXX-XXXX in this example), the call processor 26 re-routes (i.e., call-forwards) the call to telephone line 16a (i.e., directory number 508-NYY-YYYY in this example).

Figure 2:
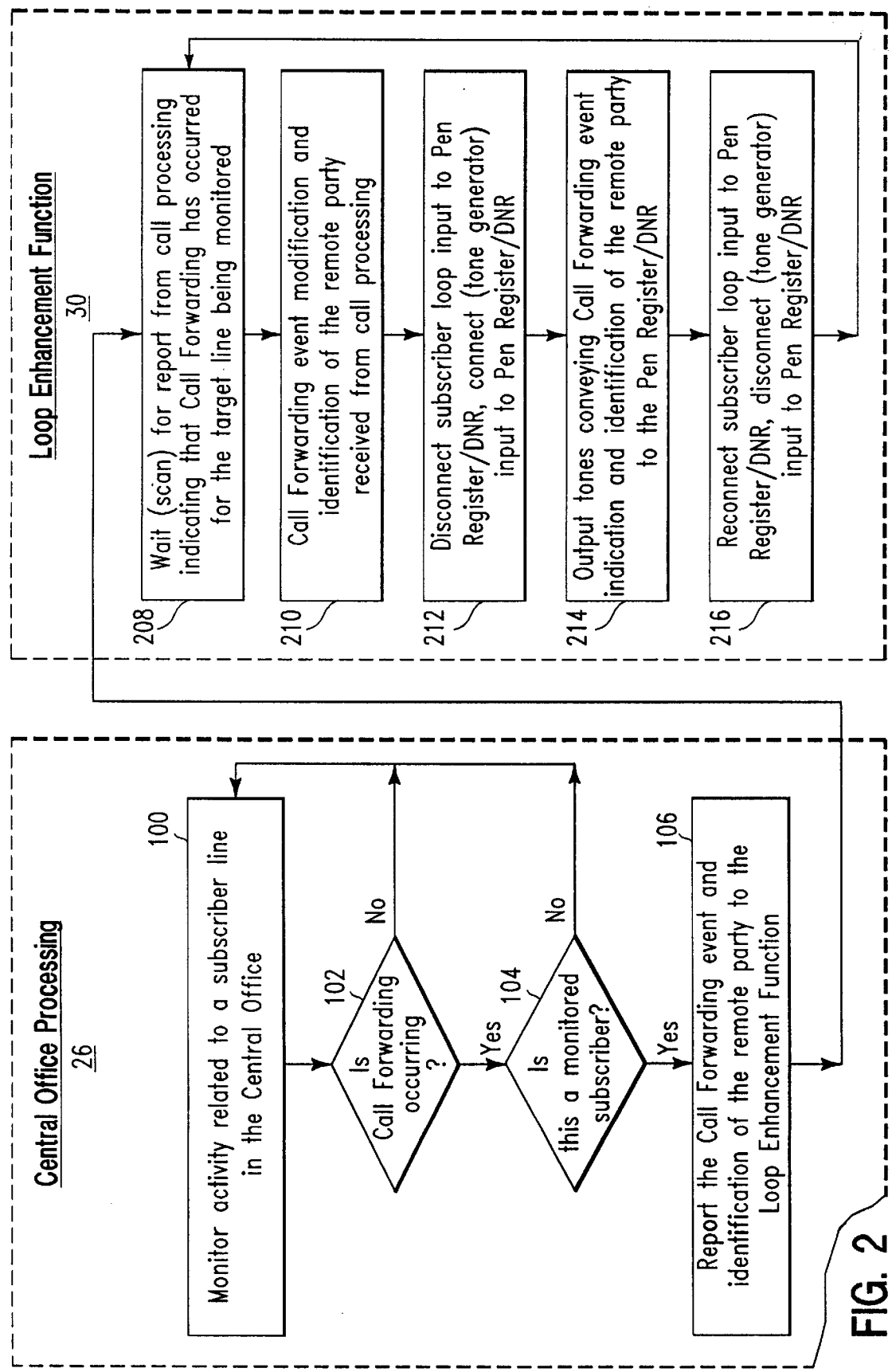
FIG. 2 is a flow diagram of a method of wiretapping a target in accordance with the invention.

More particularly, and referring also to FIG. 2, the call processor 26 at the central office 12 monitors call activity occurring on the subscribers telephone lines 14a–14n, (Step 100). If a call comes into the central office 12, the call processor 26 determines whether call-forwarding is occurring (Step 102). If the call is not to be call-forward, the call is routed to the called telephone line and the monitoring is re-established (Step 100). If, however, the subscriber has instructed the telephone company to call-forward call to another telephone line (i.e., the call-forwarded telephone line), the call processor 26 determines whether the called subscriber has been designated as a "monitored subscriber", that is, whether the called telephone line is a target (Step 104). If the called telephone line has not been designated as a target, the monitoring is re-established (Step 100). If, however, the called telephone line has been designated as a target, here, for example the called telephone line 16a (i.e., directory number 617-NXX-XXXX), a report of the call-forwarding event, and identification of the call-forwarded telephone directory number, (here in this example, directory number 508-NYY-YYYY) is provided by the call processor 26 to a loop enhancement function 30 (FIG. 1) located at the central office 26 (Step 106).

The loop enhancement function 30 (FIG. 1) includes a call forward event and reporting processor 32. The call-forward event and reporting processor 32 waits (i.e., scans) for call-forward events from the call processor 26 (i.e., events which indicate that the call-forwarding has occurred for the target telephone line being monitored (FIG. 2, Step 208). When a call-forward event, along with identification of the call-forwarded telephone number, (here directory number 508-NYY-YYYY) is received (Step 210), a call-forward event control signal is fed to switch 22 (Step 212) and the recording device 20 is disconnected (i.e., switched) from the subscriber loop input, i.e., here subscriber target telephone line 16n, to a tone generator 36 included in the loop enhancement function 30. Because of the switching action on the target telephone line 16a, the steady "fourth column" "C" tone, produced by an interface, if used, or the steady on-hook dc voltage on the target telephone line 16a, is interrupted (i.e., broken) and therefore the recording device 20 may interpret this break in steady state tone, or dc voltage, as the case may be, as an off-hook condition at the target telephone line 16n when, in fact, the call to target line 16n is being forwarded to an different telephone line, here telephone line 16a. Thus, in order to indicate that the switching action has occurred (i.e., the presence of a detected call-forward event), the tone generator 36 produces tones conveying call-forwarding event report (here, for example, a "fourth column" "D" tone) to the recording device 20. Signalling, identification of the call-forwarded telephone number (here, in this example, 508-NYY-YYYY), and if court authorized, conversation via the voice path 37, are also fed by the call-forward event and reporting processor 32 to the recording device 20 (Step 214). After the call, or forwarding notification, is completed (Step 216), monitoring is re-established as described above in connection with Step 100.

Figure 3:
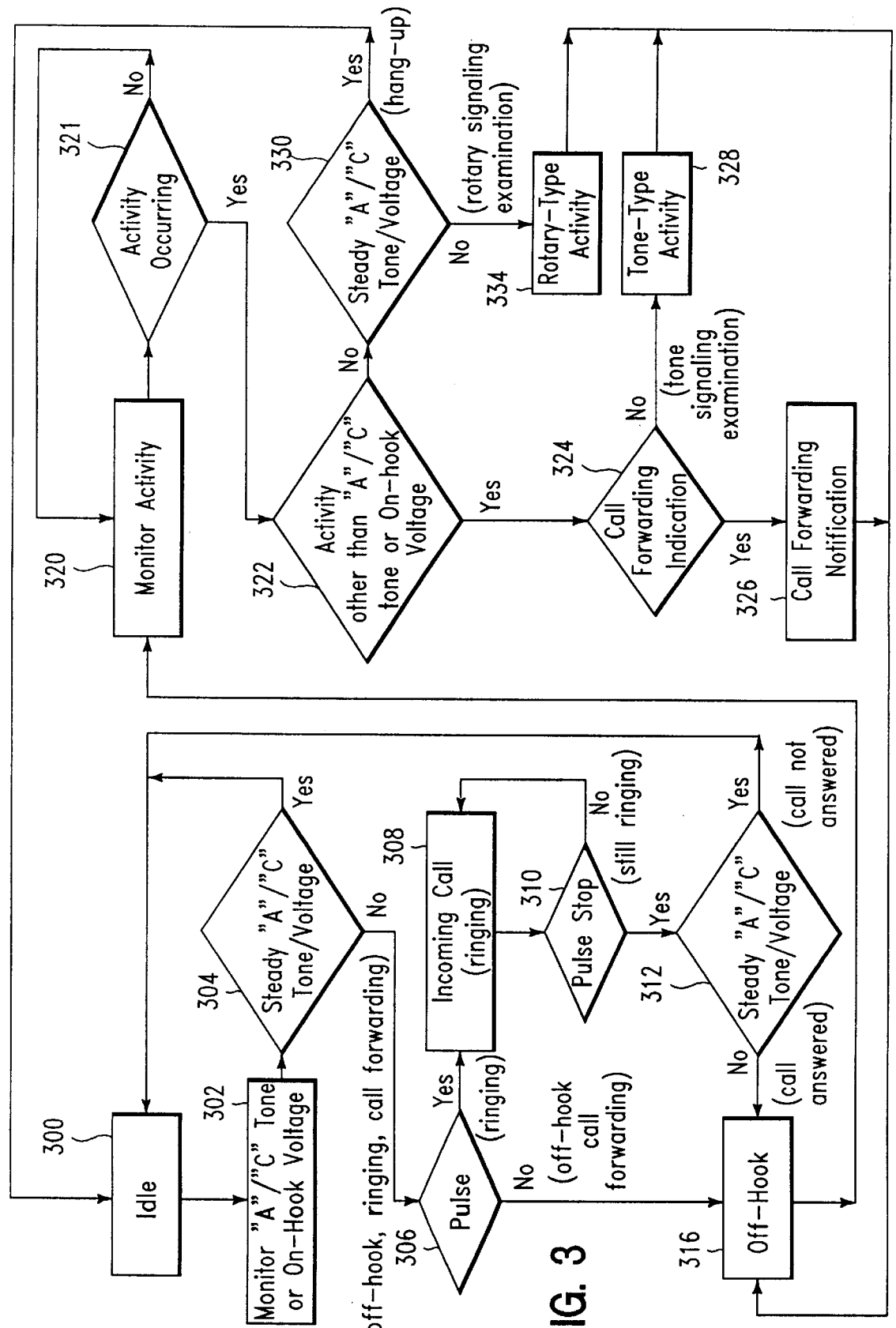
FIG. 3 is a flow diagram showing the operation of a pen register recording device used in the system of FIG. 1.

More particularly, referring also to FIG. 3, initially the recording device 20 is in an idle state (Step 300). During the monitoring Step 300, the recording device 20 monitors either a break in the steady "fourth column", "C" or "A" tone, when the interface 24 is included using a decoder; or, a change in line voltage, when the interface 24 is not included or does not employ a decoder. If the "C" or "A" tone, or line voltage, as the case may be, is steady, the recording device 20 remains in the idle state (Step 300). If, on the other hand, the tone, or on-hook line voltage, as the case may be, is not steady, an off-hook condition, ring condition, or call-forwarding event (fourth column "D") condition tone may exist (Step 306). The non-steady condition is detected by the recording device 20. If there is a sequence of pulses typical of ringing, an incoming call is recognized by the recording device 20 (Step 308). A test is made as to whether the sequence of pulses stops (Step 310). When the sequence of pulses stops, a determination is made as to whether there is a steady "fourth column" "C" or "A" tone or a steady on-hook voltage (Step 312). If the fourth column "C" or "A" tone or on-hook voltage is steady, the telephone has gone un-answered and the recording device 20 returns to the idle condition (Step 300). If, on the other hand, the fourth column "C" or "A" tone or on-hook voltage is not steady, an off-hook condition is indicated (Step 316). signalling activity present during the off-hook condition is monitored by the pen register 20 (Step 320).

If, in Step 306 the sequence of pulses is not detected, an off-hook condition occurs (Step 316) and signally activity is monitored (Step 320).

If, in monitoring the signalling activity (Step 320), activities other than "C" or "A" tone or off-hook voltage change activity is detected (Step 322), a determination is made as to whether a call-forward indication is present, i.e., a test is made for a call-forward event tone report, here in this example, the "fourth column" "D" tone (Step 324). If the call-forward event tone is reported (Step 326), call forward notification, signalling, the call-forwarded telephone line, here, in this example, directory number 508-NYY-YYYY, and, if court authorized, conversation will be made present for recording by the recording device 20 and the system returns to the off-hook state (Step 316). If a call-forwarding indication is not present in Step 324, tone type activity examination and reporting will be applied by the recording device 20 (Step 328) and the system returns to the off-hook condition (Step 316).

If, on the other hand, activities other than "A" or "C" tone or off-hook voltage change are not detected in Step 322, a hang-up or rotary-type condition is detected. If a steady "A" or "C" tone is detected or steady on-hook voltage is detected (Step 330), a hang-up condition is indicated and the system returns to the idle condition (Step 300). If, on the other hand, a steady "A" or "C" tone is not detected or steady on-hook voltage is not detected in Step 330, rotary type activity examination and reporting will be applied by the recording device 20 in its normal fashion (Step 334). The system then returns to the off-hook state (Step 316).

The embodiments described herein are merely illustrative of the principles of the present invention. Various modifications may be made thereto by persons ordinarily skilled in the art, without departing from the scope or spirit of the invention.

What is claimed is:

1. A method of intercepting a call on a telecommunications line, comprising the steps of:
   a. monitoring the call activity on a telecommunications line;
   b. determining whether or not call-forwarding is occurring on the telecommunications line; and
   c. recording the call activity of the call-forwarded telecommunications line.

2. The method of claim 1, further comprising the step of continuing monitoring the call activity on the telecommunications line if it is determined that call-forwarding is not occurring on the telecommunications line.

3. The method of claim 1, further comprising the step of determining whether or not the call activity of the call-forwarded telecommunications line may be recorded.

4. The method of claim 1, wherein the step of recording comprises recording the call activity of the call-forwarded telecommunications line upon the meeting of predetermined criteria.

5. The method of claim 1, wherein the step of recording comprises monitoring the call activity on the call-forwarded telecommunications line and recording predetermined types of call activity.

6. The method of claim 1, wherein the call activity to be recorded comprises at least one call activity selected from the group consisting of signalling information, voice, data, image, and multimedia information.

7. The method of claim 1, wherein each telecommunications line comprises multiple transmission channels that are adapted to carry various types of call activity.

8. A method of intercepting a telecommunications call, comprising the steps of:
   a. monitoring the call activity on a first telecommunications subscriber loop;
   b. recording the call activity on the first telecommunications subscriber loop;
   c. recording the call activity of a second telecommunications subscriber loop upon the detection of a predetermined call feature occurring for the first loop.

9. The method of claim 8, wherein the step of recording the call activity of the second telecommunications subscriber loop comprises switching from the recording of the call activity of the first loop to the recording of the call activity of the second loop.

10. The method of claim 8, wherein the predetermined call feature comprises call-forwarding to the second telecommunications subscriber loop.

11. The method of claim 8, wherein the step of recording the call activity of the second telecommunications subscriber loop comprises recording the call activity of the second loop upon the meeting of predetermined criteria.

12. The method of claim 8, wherein the step of recording the call activity of the second telecommunications subscriber loop comprises monitoring the call activity on the second telecommunications subscriber loop and recording predetermined types of call activity.

13. The method of claim 8, wherein the step of recording the call activity of the second telecommunications subscriber loop comprises monitoring a replication of the call activity on the second telecommunications subscriber loop and recording predetermined types of call activity on the second loop.

14. The method of claim 13, wherein the replication of the call activity on the second telecommunications subscriber loop contains additional information on the call activity on the second loop and the step of recording the call activity of the second telecommunications subscriber loop comprises recording predetermined types of additional information on the call activity.

15. A method of intercepting the incoming and outgoing calls of a telecommunications subscriber, comprising the steps of:
   a. monitoring by a telecommunications switch the call activity of the telecommunications line of the subscriber;
   b. recording by a recording device predetermined types of call activity on the subscriber telecommunications line;
   c. monitoring by the telecommunications switch the call activity of a second telecommunications line upon the detection of a predetermined call feature occurring for the subscriber; and
   d. recording by the recording device predetermined types of call activity on the second telecommunications line upon the monitoring of the second line.

16. The method of claim 15, further comprising the step of switching by the switch, upon the detection of a predetermined call feature occurring for the subscriber, from the monitoring of the call activity of the subscriber line to the monitoring of the call activity of the second line and from the recording of the call activity of the subscriber line to the recording of the call activity of the second line.

17. The method of claim 16, wherein the step of switching comprises switching the connection of the recording device from the subscriber telecommunications line to the second telecommunications line.

18. The method of claim 17, further comprising the step of notifying the recording device of the connection switching.

19. The method of claim 17, further comprising the step of notifying the recording device of the connection switching before the step of switching.

20. The method of claim 15, wherein the predetermined call feature comprises call-forwarding to the second telecommunications line.

21. The method of claim 15, wherein the step of recording call activity on the second telecommunications line comprises recording predetermined types of call activity from a replication of the call activity on the second line.

22. The method of claim 21, wherein the replication of the call activity on the second telecommunications line contains additional information on the call activity on the second line and the step of recording call activity on the second line comprises recording predetermined types of additional information on the call activity.

23. The method of claim 16, wherein the step of switching comprises replicating by the switch the call activity of the second telecommunications line and switching the connection of the recording device from the subscriber telecommunications line to the replication of the call activity of the second line.

24. The method of claim 23, wherein the replication of the call activity on the second telecommunications line contains additional information on the call activity on the second line and the step of recording call activity on the second line comprises recording predetermined types of additional information on the call activity.

* * * * *